March 15, 1966     R. F. GOEPNER     3,240,185
ADHESIVE APPARATUS

Filed May 15, 1962     2 Sheets-Sheet 1

INVENTOR.
RUDOLPH F. GOEPNER
BY
ATTORNEYS

March 15, 1966
R. F. GOEPNER
3,240,185
ADHESIVE APPARATUS
Filed May 15, 1962
2 Sheets-Sheet 2
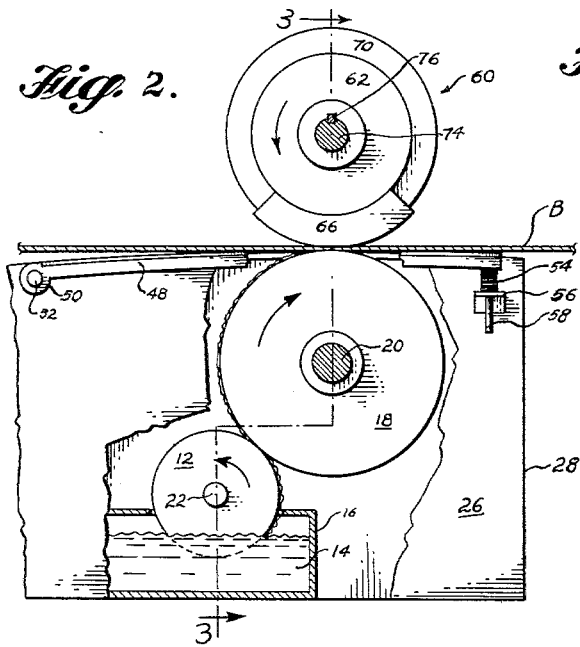
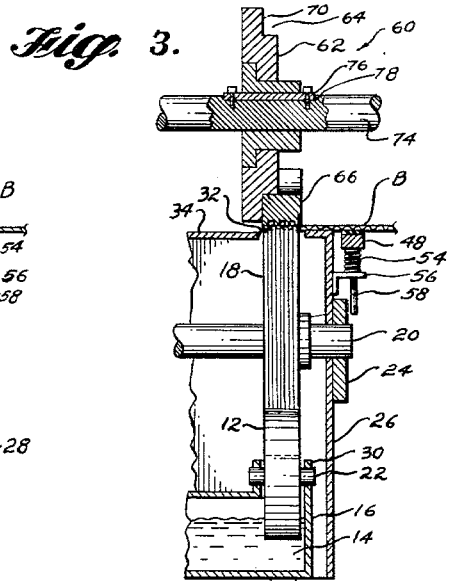
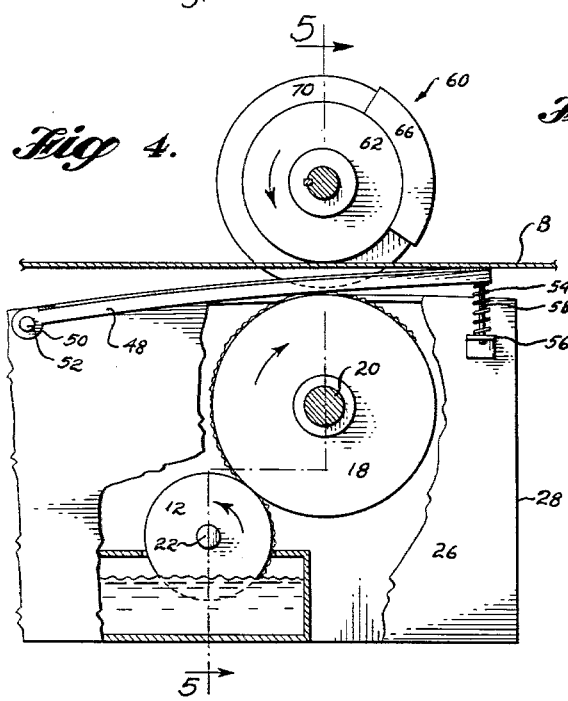
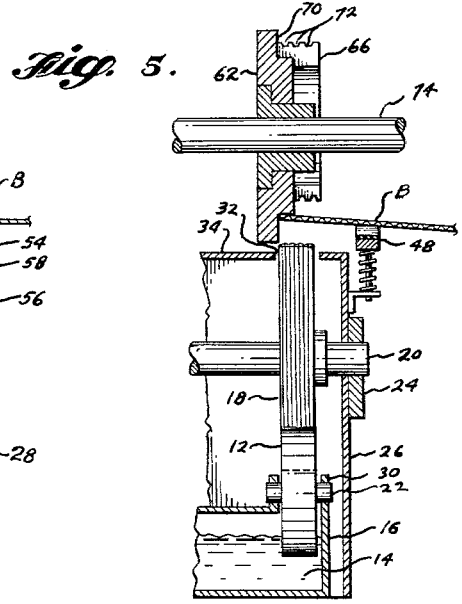
INVENTOR.
RUDOLPH F. GOEPNER
BY
ATTORNEYS 3,240,185
ADHESIVE APPARATUS
Rudolph F. Goepner, Palmyra, N.J., assignor to Weyerhaeuser Company, Tacoma, Wash., a corporation of Washington
Filed May 15, 1962, Ser. No. 194,897
1 Claim. (Cl. 118—247)

This invention relates to apparatus for placing an adhesive material on selected areas of an object, and to apparatus which may be used interchangeably for the continuous or intermittent placement of an adhesive material on a passing object.

Continuous strips of adhesive material are usually placed on the underside of a passing object, such as a carton blank or paperboard or other material, by a continuously revolving applicator mounted under the path of travel of the object and tangential to the path of travel of the surface to which the adhesive is applied. The speed of travel of the periphery of the applicator is equal to the speed of travel of the object to avoid smearing or non-application of the adhesive.

It is more difficult to apply discontinuous strips of adhesive material to passing objects, however, because of the necessity of maintaining the material out of contact with the applicator during parts of the cycle. A standard solution to this problem has been the use of overhead adhesive application apparatus. However, adhesive application apparatus mounted above the material is more costly than apparatus mounted under the material because the overhead apparatus must be sealed to prevent the dripping of adhesive material onto the passing object. There may also be a greater initial cost in the provision of apparatus both over and under the path of travel of the object if it is necessary to switch from continuous to intermittent adhesive application. The last situation is usually present if a continuous apparatus is modified for intermittent placement of adhesive material on a passing object.

It is therefore an object of this invention to provide an apparatus which may economically modify a continuous adhesive apparatus for intermittent adhesive application.

It is a further object of this invention to provide an apparatus for the placement of adhesive on specific areas of a carton blank which may utilize existing continuous adhesive placement equipment.

It is another object of this invention to provide apparatus for placing adhesive material on specific areas of a passing object which is both economical to manufacture and economical to use.

It is still another object of this invention to provide an apparatus which may place continuous or discontinuous strips of adhesive material on a passing object, and which is readily interchangeable between the two operations.

It is also an object of this invention to provide an apparatus which will place adhesive material on selected areas of the underside of a passing object.

These and other objects of this invention will become readily apparent upon the reading of the following specifications in conjunction with the attached drawings.

FIGURE 2 is a side view of the adhesive apparatus during the portion of the operation in which adhesive material is placed on the lower face of the passing object. Portions of the apparatus have been cut away to show interior details of construction.

FIGURE 3 is a cross-sectional view of the apparatus taken along line 3—3 of FIGURE 2.

FIGURE 4 is a side view of adhesive apparatus during the portion of the operation in which adhesive material is not placed on the passing object. Again, portions of the apparatus have been cut away to show interior details of construction.

FIGURE 5 is a cross-sectional view of the apparatus taken along line 5—5 of FIGURE 4.

Figure 1:
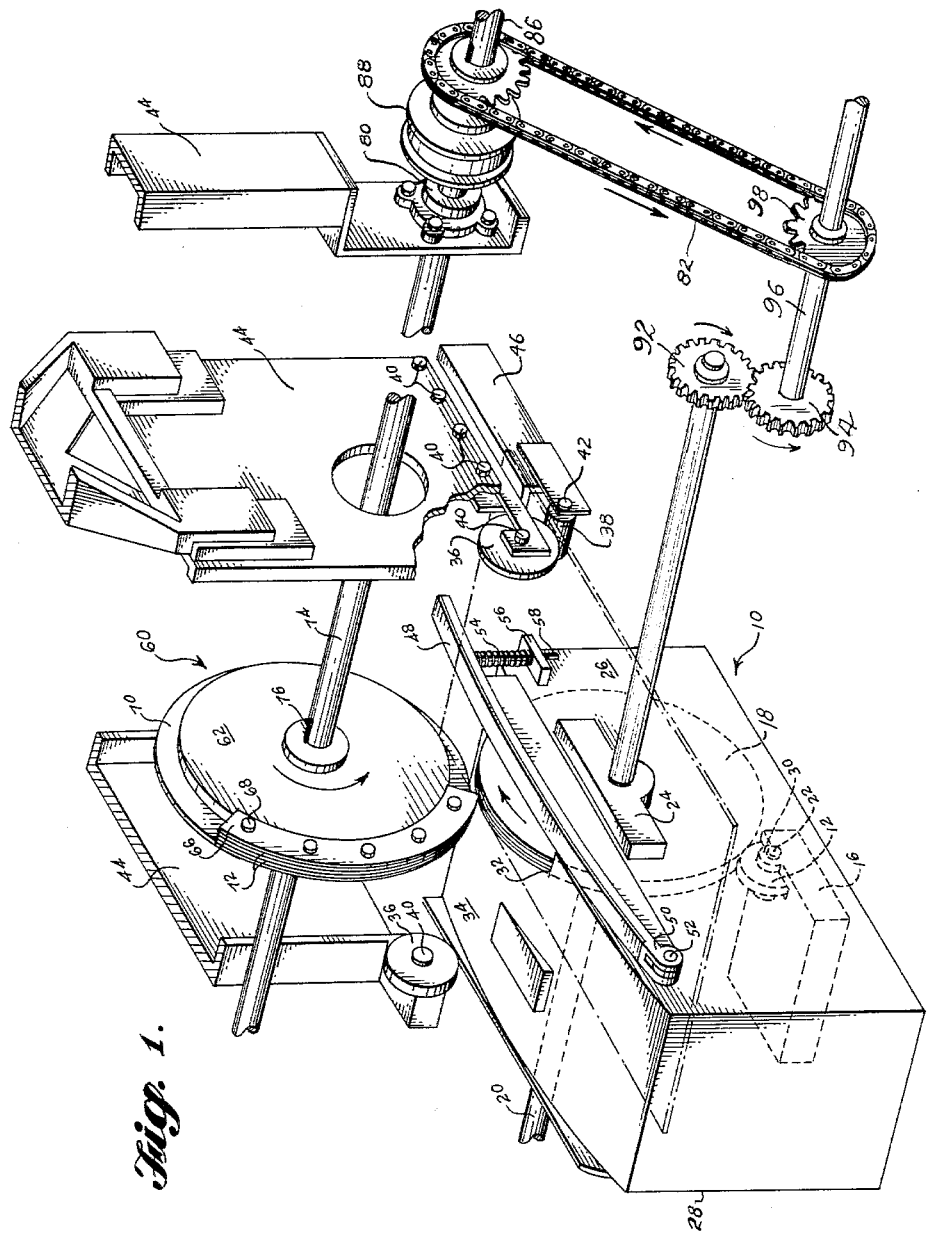
FIGURE 1 is an isometric view of an apparatus for applying either continuous or discontinuous strips of adhesive to the underface of a passing object.

The figures illustrate, in a diagrammatic manner, apparatus for the intermittent placement of adhesive material on the underface of a flat container blank, and apparatus for guiding the blank through the adhesive apparatus and into the subsequent operations to be performed on a blank.

The reference numeral 10 indicates an apparatus in which a continuously revolving transfer roll 12 transfers adhesive material 14 from a reservoir 16 to a continuously revolving applicator 18. The respective shafts 20 and 22 of the applicator 18 and the transfer roll 12 rotate, respectively, in suitable bearings 24, mounted on the side wall 26 of housing 28, and bearings 30, mounted on reservoir 16, and are rotated by a suitable power means (not shown). The continuous rotation of the transfer roll 12 and the applicator 18 prevents the adhesive from drying on either the transfer roll or the applicator.

The applicator 18 protrudes through an aperture 32 in the upper wall 34 of housing 28, and contacts the underface of a blank B passing over the applicator, placing adhesive material on the underface. Smearing or nonplacement of adhesive material on the face is usually prevented by rotating the applicator 18 at a peripheral speed that equals the linear speed of the blank. It is usual to have a direct and simple relationship, as 1:1 or 1:2, between the revolutions of the applicator 18 and the number of blanks B passing over the applicator.

The blanks B are guided through the operation by a first guide means. This means comprises guide rolls 36 and 38 having their shafts 40 and 42, respectively, mounted in bearings on a frame 44, and by guide rails 46 which are also mounted on the frame 44. The guide rolls 36 bear against the top face of the blank B, and the guide rolls 38 and the guide rails 46 bear against the bottom face of the blank B. The blank B is, therefore, guided over the applicator 18 in a path that is tangential to the periphery of the applicator.

The above apparatus will place a continuous strip of adhesive material on the lower face of a corrugated carton blank. It will be understood that this apparatus may be used with objects of various sizes and shapes, and that the specific details of construction will depend in part on the object passing through the apparatus.

It has been found that a slight modification to the above apparatus will allow the applicator 18 to be used for the placement of adhesive material on only selected areas of the lower face of passing objects. The additional apparatus required for this modification is easily removable, allowing the adhesive apparatus to be used interchangeably for both continous and discontinuous placement of adhesive material on passing objects. It normally maintains the blank B out of contact with the applicator 18 and forces only selected areas of the blank B into contact with the applicator 18. The additional apparatus may also be used to place a continuous strip of adhesive on the blank.

The blank B is maintained out of contact with applicator 18 by a second guide means. This means comprises an upwardly biased lifting shoe or lifting plate 48 mounted beside the applicator. The shoe has a clevis 50 at its front end that is pivotably mounted on a pin 52 on the side wall 26 of housing 28. The shoe 48 may pivot around pin 52 from a position above applicator 18, FIGURES 4–5, to a position below applicator 18, FIGURES 2–3, thereby placing blank B out of contact or in contact with applicator 18. The shoe 48 is normally biased into its upper position by a compression spring 54 contacting the underside of the shoe. The spring 54 is mounted on a plate 56 attached to the side 26 of the housing 28, and its relationship to the shoe 48 is maintained by a guide rod 58 mounted on the underside of shoe 48 and extending through the spring 54 and an aperture in the plate 56.

The blank B is forced into contact with the applicator 18 by an overhead cam mechanism 60. This mechanism comprises a wheel 62 having a peripheral notch 64 in one of its faces. Cam segments 66 may be placed in notch 64 and fixed to the wheel 62 by any suitable means such as the machine screws 68 which fit into a series of tapped holes in the vertical face 70 of notch 64. The segments 66 may be of a fixed size, as shown in the drawings, if the area of placement is of a fixed size, or they may be small units which may be joined to form a large unit or may be placed at various locations on the periphery of the wheels 62 if the area or location of the placement is varied.

The cam segments 66 may extend radially outwardly of the wheel 62 and contact the object below the periphery of the wheel 62, or the segments 66 may extend horizontally of the wheel 62 and contact the object at a position beside the wheel. In each instance the periphery of the wheel 62 will not contact the object and the periphery of the segments 66 will contact the object.

Each of the segments 66 has a series of grooves 72 on its outer edge. These grooves are aligned with the grooves on the outer edge of applicator 18, and place equal pressure on both faces of the blank.

The movement of the segments 66 must be timed to the movement of the blanks B so that the adhesive will be placed on the proper area of each of the blanks as it passes through the operation. This requires that the peripheral speed of the segments be equal to the lineal speed of the blanks. The preferred arrangement for attaining this speed relationship is to construct the wheel 62 and the segments 66 so that the radius of the wheel and segment is equal to the radius of the applicator 18, and to drive both the wheel and the applicator at the same speed from the same power source. In the apparatus illustrated, the applicator 18 and the overhead cam 60 are both driven from the applicator drive shaft.

As shown, the wheel 62 is fixedly mounted on shaft 74 by a key 76 and a keyway 78. The shaft 74 is mounted in a bearing 80 on the frame 44 and is driven by a chain 82 that is connected to the drive shaft 20 of the applicator 18 through gears 92 and 94, shaft 96, and drive sprocket 98. The chain 82 is also connected to shaft 74 through a sprocket 84 fixedly mounted on a shaft 86 and a clutch 88. This entire drive allows the applicator 18 and the wheel 62 to rotate simultaneously and at the same peripheral speed. Therefore, the segmented cam 60 and the applicator 18 are timed to the speed of the blank passing through the machine, and place adhesive on the same selected area of each blank as it passes through the machine.

The apparatus may be used for continuous application of adhesive to an object by removing the lifting shoe 48 from the housing 28 and by removing the segments 66 from the overhead cam 60. It is also possible to slide the wheel 62 on the shaft 74 until it is out of the path of travel of the objects. The apparatus may then be used for discontinuous application of adhesive on an object by placing the shoe 48 on the housing 28, by positioning the wheel 62 on shaft 74 over the applicator 18, and by positioning the segments 66 on the wheel 62 for the desired glue pattern. Thus the apparatus is quickly interchanged for both continuous and discontinuous placement of adhesive on passing objects.

Although the apparatus has been illustrated as being used for the application of adhesive to selected areas of an edge of a carton blank, it will be appreciated that the apparatus may be used for other objects and for areas on sections of the object other than the edge, and that many changes and modifications may be made on the apparatus without departing from the spirit of the invention. It will therefore be understood that the specific details of the preferred embodiment shown and described herein are intended to be illustrative only, and are not intended to limit the scope of the invention.

I claim:

Apparatus for placing adhesive on a container blank comprising a rotatable glue applicator wheel having peripheral grooves thereon, a first means for guiding said container blank by said glue wheel and maintaining said container blank in contact with said glue wheel, said first means being spaced from said glue wheel and having elements which bear against the upper and lower surfaces of said container blank to maintain it in contact with said glue wheel, second means for guiding said container blank by said glue wheel in a position that is normally out of contact with said glue wheel, said second guide means being closer to said glue wheel than said first guide means, and having a first position in which said container blank is maintained out of contact with said glue wheel and a second position in which said container blank is in contact with said glue wheel, said second guide means comprising a shaft mounted forwardly of said glue wheel, a guiding surface pivotably mounted on said shaft, a spring mounted under said surface and upwardly biasing said surface into said first position, a rotatable wheel mounted above said glue applicator wheel, said rotatable wheel having a peripheral groove on a side face and a series of spaced holes along said groove for mounting cam segments in said groove, cam segments within said groove at certain of said holes, said cam segments being aligned with said glue applicator wheel and having grooves therein in alignment with said grooves in said glue applicator wheel, and means for rotating said rotatable wheel whereby the peripheral speed of said cam segments is equal to the linear speed of said blanks so that the cam segments may move the blank and the second guide means into said second position so that preselected areas of said blank may have glue applied thereon.

References Cited by the Examiner

UNITED STATES PATENTS

| 1,583,577 | 5/1926 | Coleman | 68—203 |
|---|---|---|---|
| 1,704,797 | 3/1929 | Huye | 118—245 |
| 2,130,786 | 9/1938 | Bergstein | 118—247 X |
| 2,349,063 | 5/1944 | Von Hofe | 118—238 X |
| 2,599,008 | 6/1952 | Palmer | 118—212 X |
| 2,674,974 | 4/1954 | Gwinn et al. | 118—247 X |
| 2,726,174 | 12/1955 | Friel et al. | 118—247 X |
| 2,747,542 | 5/1956 | Nowicki | 118—249 X |
| 3,092,513 | 6/1963 | Browning | 118—212 |

FOREIGN PATENTS

| 963,392 | 5/1957 | Germany. |
|---|---|---|

CHARLES A. WILLMUTH, *Primary Examiner.*

RICHARD D. NEVIUS, *Examiner.*